US007228354B2

(12) United States Patent
Chambliss et al.

(10) Patent No.: US 7,228,354 B2
(45) Date of Patent: Jun. 5, 2007

(54) METHOD FOR IMPROVING PERFORMANCE IN A COMPUTER STORAGE SYSTEM BY REGULATING RESOURCE REQUESTS FROM CLIENTS

(75) Inventors: David Darden Chambliss, Morgan Hill, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 10/187,227

(22) Filed: Jun. 28, 2002

(65) Prior Publication Data

US 2004/0003087 A1  Jan. 1, 2004

(51) Int. Cl.
*G06F 15/16* (2006.01)
(52) U.S. Cl. .............................. 709/229; 710/5; 710/6; 718/104; 370/395.4
(58) Field of Classification Search ................ 709/226, 709/227, 245, 225; 711/121, 211; 710/15, 710/5, 6; 718/104
See application file for complete search history.

(56) References Cited

U.S. PATENT DOCUMENTS

| 5,287,500 | A | * | 2/1994 | Stoppani, Jr. ............... 711/211 |
| 5,412,647 | A | | 5/1995 | Giroux et al. |
| 5,434,892 | A | | 7/1995 | Dike et al. |
| 5,926,834 | A | | 7/1999 | Carlson et al. |
| 6,119,174 | A | * | 9/2000 | Borowsky et al. ............ 710/15 |
| 6,195,730 | B1 | * | 2/2001 | West .......................... 711/121 |
| 6,252,614 | B1 | * | 6/2001 | Mullin ....................... 345/560 |
| 6,269,410 | B1 | * | 7/2001 | Spasojevic ..................... 710/5 |
| 6,304,906 | B1 | * | 10/2001 | Bhatti et al. ................ 709/227 |
| 6,434,631 | B1 | * | 8/2002 | Bruno et al. ................... 710/6 |
| 6,636,905 | B1 | * | 10/2003 | McNamer et al. ............ 710/15 |
| 6,671,724 | B1 | * | 12/2003 | Pandya et al. .............. 709/226 |
| 6,948,000 | B2 | * | 9/2005 | Desai et al. ................ 709/245 |
| 6,976,258 | B1 | * | 12/2005 | Goyal et al. ................ 718/104 |

OTHER PUBLICATIONS

John Chung-I Chuang, Marvin A. Sirbu; "Distributed Network Storage Service with Quality-of-Service Guarantees"; Jun. 1999; Proceedings of the Internet Society INET '99 Conference; pp. 1-26.*
"Hippodrome: Running Circles Around Storage Administration" by E. Anderson et al., Jan. 2002 Proceedings of the Conference on File and Storage Technologies (FAST, Jan. 2002), pp. 175-188.
"Disk Scheduling with Quality of Service Guarantees", Proceedings of the IEEE International Conference On Multimedia Computing and Systems, Jul. 1999 (ICMCS'99).
"An Efficient Storage Scheme for Multimedia Server", Proceedings of the IEICE Transaction Information. & Systems., vol. E79-D, No. 6, Jun. 1996.

* cited by examiner

*Primary Examiner*—Nathan J. Flynn
*Assistant Examiner*—Dustin Nguyen
(74) *Attorney, Agent, or Firm*—Michael J. Buchenhorner

(57) ABSTRACT

A method and system for optimizing the performance of a storage system by classifying each client request for resources based on operational limits of the resources and controlling when to submit the request for processing based on service class. The operational limits are determined from performance characteristics of the system resources and from the level of performance guaranteed to each client. By regulating the clients' usage of resources using the resource operational limits, total system performance requirements and guarantees can be achieved.

24 Claims, 13 Drawing Sheets

METHOD FOR IMPROVING PERFORMANCE IN A COMPUTER STORAGE SYSTEM BY REGULATING RESOURCE REQUESTS FROM CLIENTS

TECHNICAL FIELD

This invention relates to computer storage systems, and more particularly to a storage system and method for controlling the processing of requests for resources to improve the system performance.

BACKGROUND OF THE INVENTION

An organization that offers a data storage service, such as a Storage Service Provider (SSP) or an information services department within a company, needs to ensure that performance requirements are met for accessing the stored data. It is common in computer systems for a single data storage system to be used to hold data for multiple storage clients, which may be different computers, different applications, or different users. When the data storage system is owned by a Storage Service Provider (SSP), different clients using the same system may be separate customers, with separate contractual arrangements with the SSP.

A storage system has many components that participate in the servicing of requests from clients. These include but are not limited to: arm actuators, data channels, disk controllers, memory buses, and protocol chips on the disk drives themselves; processors, memory controllers, buses, and protocol chips on storage system controllers; and SCSI buses, network links, loops, fabric switches, and other components for the client-to-controller and controller-to-disk interconnect. A request generally requires several of these components to participate at particular steps in its processing. Many components can generally be used concurrently, so that steps in the servicing of many requests are being performed simultaneously.

To facilitate the concurrent utilization of resources, the system is built with an ability to enqueue requests and the subtasks involved in servicing them. There is a tradeoff between throughput (the total number of requests or number of bytes processed) and response time (the elapsed time from when the request is received by the system and when its completion is reported to the client). To achieve maximum throughput, a client usually submits a large number of requests for data. The large request load enables efficient workload scheduling in the system, but the response time in this case may be many times greater than that for a lightly loaded system because the requests spend a long time in the queue before being serviced.

Typically, the storage system contains one or more storage devices such as disk drives for storing data in a persistent way. It also contains one or more processors that handle requests for access, generally calling upon the storage devices to do so. Associated with these storage devices and processors are memory devices and data transfer channels, such as data buses, that are all needed for processing the requests. The system further includes some form of interconnect facility through which the clients submit data requests to the processors. This may be a network capable of supporting general purpose communications among clients, processors and other devices, or it may consist of more specialized interconnect facilities such as direct connections. Within one system, there may be many instances of each kind of device and facility. These are all resources of the system; however, they need not all be owned exclusively by the storage system. For example, the processors and memory buses might be involved in other computational tasks that are not part of handling storage requests from the clients.

One request from a client to the system generally does not require exclusive use of all resources. The system is designed therefore to handle many requests from many clients concurrently by scheduling stages in the processing of requests concurrently, such as disk arm motion and data transfer. One of the system's functions for achieving concurrency is queuing, by which the stages of processing for one request can be delayed when other requests are occupying required resources.

Although the data objects used by different clients will generally be separate, the storage system resources involved in accessing those data objects will often overlap. These resources may include any of the components described above, such as storage devices, processors, memory, buses, and interconnect. One client's access to data can suffer performance degradation when another client consumes too much of one or more resources. If this competition for resources is not controlled, it is impossible for guarantees to be honored regarding the level of service offered to any one client. However, a data storage service with no assurance of performance is of little value.

One approach for providing assured performance levels is to create a system capable of the required performance for the expected traffic loads. This is referred to as system provisioning and is described, for example, in U.S. Pat. No. 6,119,174 by Borowsky et al. and in the paper entitled "Hippodrome: Running Circles Around Storage Administration" by E. Anderson et al., Proceedings of the Conference on File and Storage Technologies (FAST '02), pages 175–188.

A system provisioning process does not completely solve the problem of guaranteeing performance to each client. Performance targets are met when the demand from each client matches the statistical expectations used to determine the system configuration. When demand from one client goes beyond those expectations, the performance delivered to other clients may not meet the targets. Thus, the system does not provide an effective guarantee to those clients.

U.S. Pat. No. 6,119,174 provides for the added possibility that a failure to meet performance targets may be addressed by solving the provisioning problem again and changing the system to accommodate the new demand. However, this approach does not guarantee that performance targets will be met for clients in a timely way, as the system reconfiguration may take hours or weeks to complete.

Another way for offering storage-service performance guarantees is to solve the provisioning problem for a worst-case load rather than a typical load. This method is not attractive because it is not always possible to determine useful limits on worst case loads. Even when such limits can be determined, the cost of resource needed to handle the worst case can be more than ten times the cost of the system needed to handle the actual loads.

Another solution for assuring resource availability is based on a static partitioning of the resources. This involves selecting parameters for system configuration such that each resource is used only by a reduced group of clients (which may be a single client). For example, a block-level storage service on a Fibre Channel storage network may use fabric zoning to dedicate network ports and links to particular clients, and storage subsystems may be configured so that different clients do not have data on the same disk drives. When all possibilities of competition between clients are eliminated, a level of resource guarantee is achieved. However, this approach creates a separate virtual storage system for each client from the available resource pool. It therefore has many drawbacks and is very costly.

First, many hardware resources do not support partitioning, so at least one separate device must be provided to each client. Thus a separate disk and a separate interconnect channel must be provided for each client, even if that client will never use more than a small fraction of those resources. Second, each client's partition is a fixed set of resources that must be provisioned for the worst-case load from that client, which is inefficient. Third, the administrative cost of creating and maintaining the resource partitions themselves is high. The number of recurrent tasks involved in managing the storage system will in some categories be multiplied by the number of partitions. The personnel cost of managing a storage system typically exceeds the purchase cost.

A different but related problem is that of providing bandwidth guarantees on a shared network—the network quality of service (QoS) problem. A common approach for providing guarantees on a shared network is flow shaping, by rejecting packets at the network edge. Once a "flow" is established to which bandwidth guarantees and limits apply, the network-edge devices servicing that flow are configured to reject submitted packets that would exceed the service limits. This ensures that flows do not exceed their budgeted resources. An example of the techniques for providing guarantees on a shared network is described in U.S. Pat. No. 5,412,647.

Network flow shaping technology in a storage network would not meet the need for storage-system performance guarantees. The consumption of many performance-limiting resources does not vary in proportion to bytes transmitted, so a bandwidth limit alone cannot represent the system limitations. Further, dropping individual message packets that are part of a larger operation can invoke expensive error recovery actions by the client that end up making total resource consumption worse, not better. For example, a quota of 64 kB at a moment in time could have the result that the command and all but the last data for a 64 kB read would be transmitted, but the last data packet and status report would be dropped. The client, in coping with the incomplete results, would likely reissue the entire command. Finally, network flow shaping does not have the ability to distinguish all the clients that may need to be treated differently.

Using quality-of-service (QoS) principles, and specifically variations of "weighted fair queuing", for data storage service has been studied in several published papers. An example of this work was the YFQ model described by J. Bruno et al. in "Disk Scheduling with Quality of Service Guarantees", Proceedings of the IEEE International Conference On Multimedia Computing and Systems, 1999 (IC-MCS'99). The YFQ algorithm attempts to guarantee a relative bandwidth allocation to a given client, by scheduling the operations submitted by competing clients in proportion to their assigned weights. It does not address the question of making absolute guarantees to individual clients. The environment assumed by YFQ is that all requests are submitted to a single control point, and that they are all passed on to a single resource, i.e., a disk drive.

Applying the YFQ algorithm to a storage subsystem or an entire networked storage system does not adequately address the problem of resource guaranty. First, the YFQ algorithm requires that one program has timely information on all requested operations, and controls their scheduling. Forcing all requests intended for a large-scale storage system to be handled by a single process would itself create an unacceptable performance bottleneck in the system. Second, the YFQ algorithm does not work effectively on systems with many resources—it assumes a single resource (e.g., a disk drive), and makes its scheduling decisions using an estimate of request dwell time on that resource. Such a model does not accurately represent a complex storage subsystem, in which multiple resources must be in use concurrently to achieve the intended performance. As a consequence, it cannot tell the difference between a set of complementary requests that promote concurrent use of multiple resources and a set of requests that collide on a single resource.

What is needed is a system and method for guaranteeing performance level to each of several clients in a shared storage system by regulating the processing of the resource requests from the multiple clients.

SUMMARY OF THE INVENTION

It is an object of the present invention to provide a method for optimizing the performance of a computer storage system in which multiple clients simultaneously access multiple resources of the system.

It is another object of the invention to optimize the system performance by regulating each client's usage of the resources using a resource request classifier and a flow controller (also referred to as a request throttle or a request scheduler).

It is still another object of the invention to classify the requests for resources based on the operational attributes of the resources.

It is a further object of the invention to determine the optimum time to submit a resource request for servicing based the request's service class.

To achieve these and other objects, the present invention provides a system and method for optimizing the performance of a storage system including the steps of: (a) associating, by a request classifier, each resource request with a service class, where the service class corresponds a set of operational limits for the resources; (b) determining when is the best time for the flow controller to submit the request to the resources for processing based on the service class; and (c) the flow controller submitting the request to one or more resources for processing. The operational limits are determined from performance characteristics of the system resources and from the level of performance guaranteed to each client. By regulating the clients' usage of resources based on the resource operational limits, total system performance requirements can be achieved and guaranteed.

The individual operations which constitute the access of a client to its data storage (for example, SCSI read and write commands) are examined and may be delayed as necessary to ensure that the client's resource use does not exceed acceptable limits. The flow controller determines when each request should be submitted for handling by the resources in the system, using the attributes of the request stream to make the determination. In addition, the operation of the classifier and the attributes of the service class in the flow controller can be set or modified to match the objectives of the system's owner.

The request classifier and flow controller are software components that could be installed, separately or together, within different hardware devices that participate in the formulation and handling of input/output requests. In a preferred embodiment of the invention, both components reside in one or more hardware devices termed "gateways" to provide the functions of the invention. The gateways are attached to an interconnect resource in such a way that each request, when submitted, is received by the gateway before resources other than the interconnect are used to handle the request. Furthermore, the handling by the gateway does not occur until the classifier has been invoked and the flow controller has submitted the request for further processing.

In a preferred embodiment of the invention, the operational limits correspond to the desired maximum rates at which the resources process requests in a particular service class so that they do not affect the requests in other service classes that need the same resources. In another preferred embodiment, the operational limits include the rates for transmitting data between the clients and the resources or the rates at which the resources perform disk I/O operations.

Additional objects and advantages of the present invention will be set forth in the description which follows, and in part will be obvious from the description and the accompanying drawings, or may be learned from the practice of this invention.

DESCRIPTION OF THE PREFERRED EMBODIMENTS

The invention will be described primarily as a method for improving performance of a computer storage system using a request classifier (CLS), a flow controller (CTL) and operational characteristics of the system resources. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

System Environment

Figure 1:
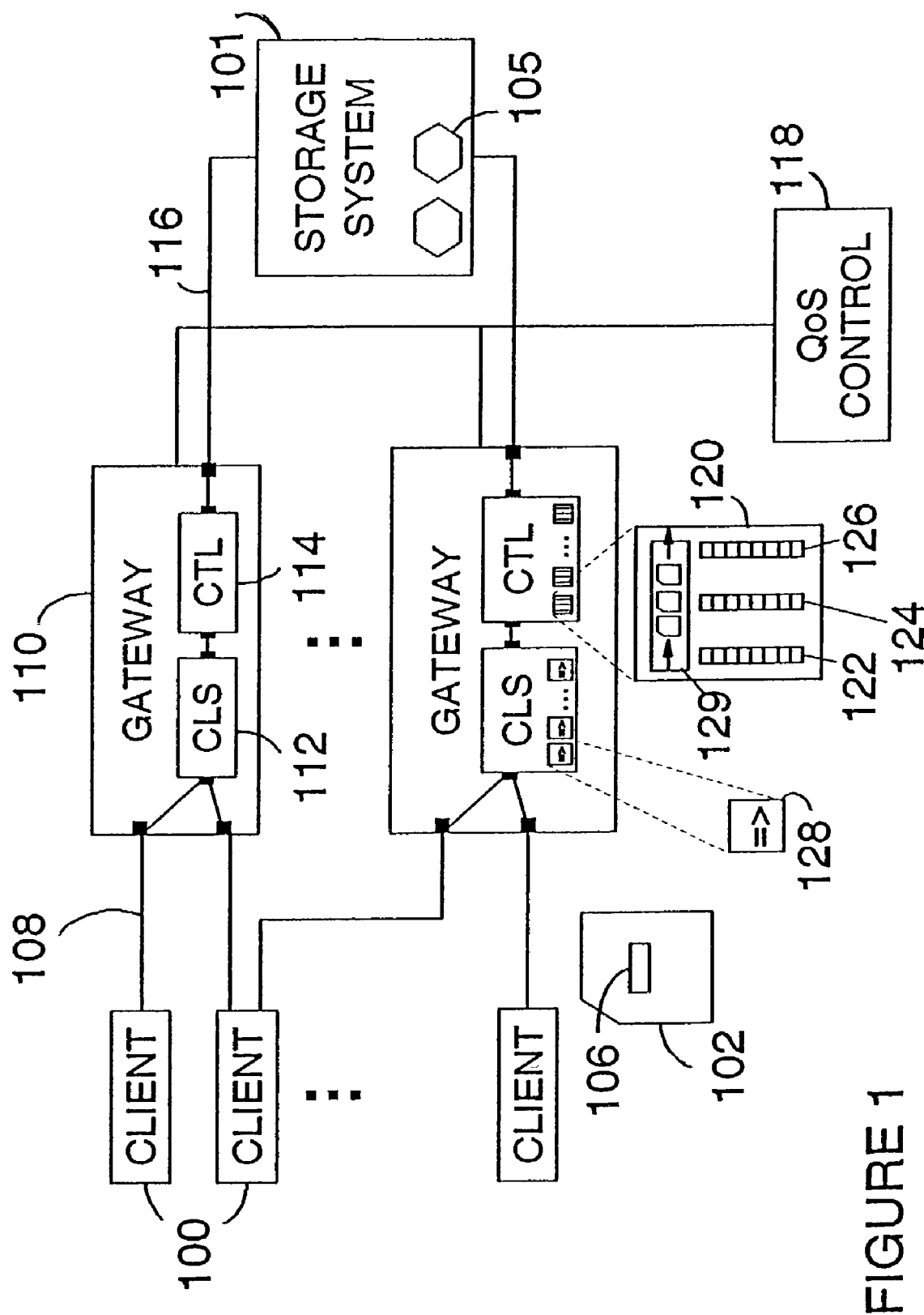
FIG. 1 is a schematic diagram showing the system of the invention.

Referring to FIG. 1, the system of the invention includes a number of clients 100 capable of generating requests 102 for the storage system 101 to store data to and retrieve data from data objects 105 associated with the storage system. The requests 102 contain attributes 106 such as whether data is stored or retrieved, the location at which the data is stored or retrieved, and the length of the request. The storage system 101 may consist of one device or multiple devices which are used by their owner to constitute a single data storage facility. Each client has at least one gateway connection 108 to a gateway 110 which includes a request classifier 112 and a flow controller 114 The connection is capable of transmitting requests to the gateway, and of transmitting responses to those requests to the client. A client may have connections to multiple gateways as well as multiple connections to the same gateways, and multiple clients may have connections to the same gateway.

Each gateway has at least one storage connection 116 to the storage system, by which it can transmit requests to the storage system and by which the storage system transmits the responses to these requests to the gateway. The gateways are connected to a QoS control 118 which provides configuration and control information to the gateways and extracts and stores monitor data from the gateways.

Within each flow controller 114 in operation are data objects each of which is referred to as a service class 120. Each service class contains a balance vector 122, a replenishment rate vector 124, and a carryover limit vector 126, the operation of which is discussed in reference to the subsequent figures. Also in each service class 120 is a delay queue 129 into which requests 102 can be placed according to the steps described below.

Within each classifier 112 in operation are data objects each of which is referred to as a classification rule 128. The classification rules 128 contain information by which each request 102 is associated with a service class 120.

Figure 2:
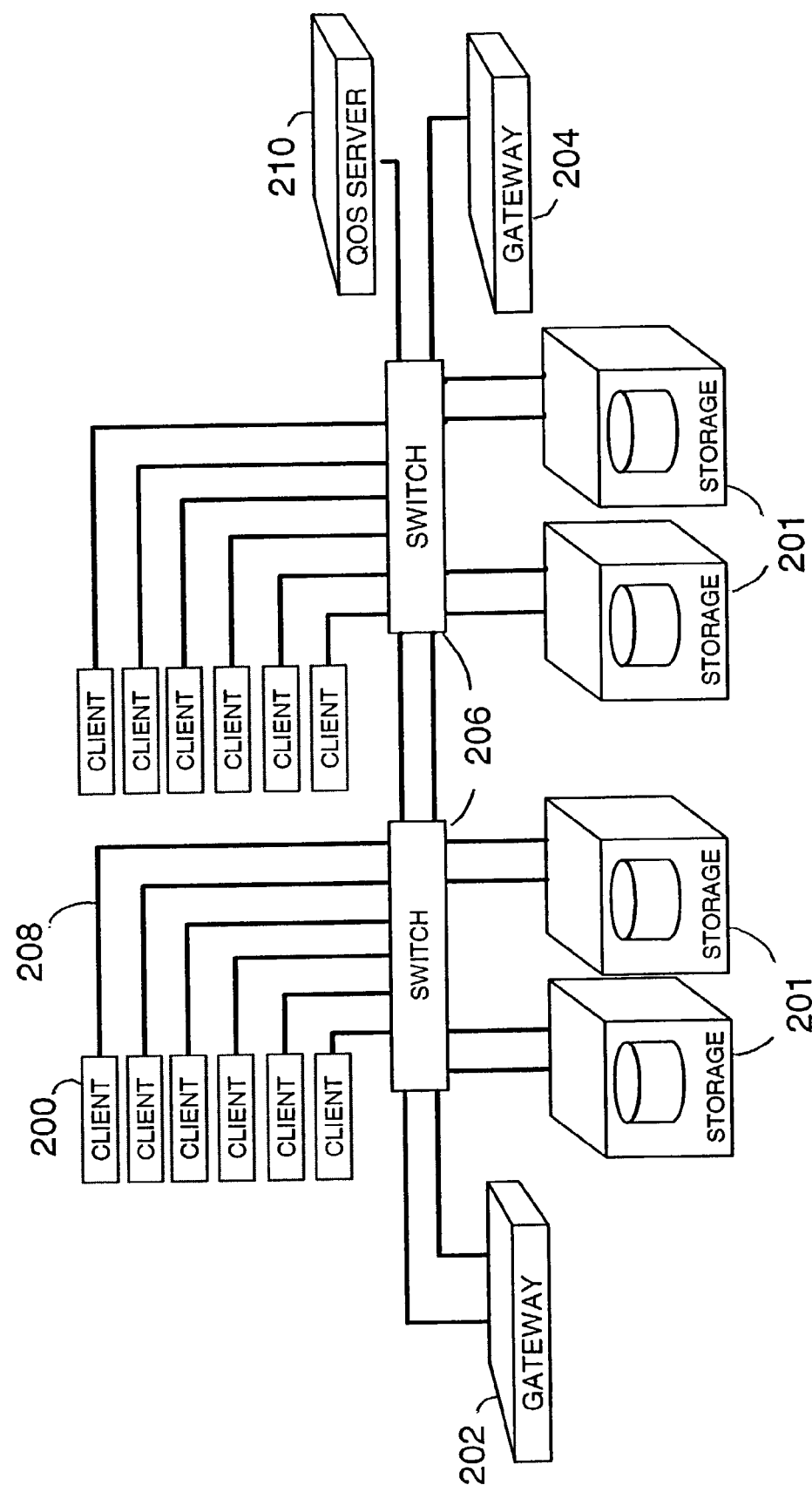
FIG. 2 is a schematic diagram showing a preferred embodiment of the invention as a gateway device in a Fibre Channel networked storage system.

FIG. 2 illustrates a preferred embodiment of the logical configuration and capabilities shown in FIG. 1. The clients 200 are computers on which applications are generating I/O requests according to the SCSI-3 standards (Small Computer Standard Interface 3) for disk devices. The storage system is a collection of RAID controllers 201 which use disk devices to create logical units which are made available for use by the clients according to SCSI-3 standards. The gateways 202 and 204 are computing devices running a program that performs the actions of a classifier 112 and a flow controller 114. The clients, storage system, and gateways are attached in a network via Fibre Channel hardware, through one or more switch fabrics 206. The logical connections 102 and 107 shown in FIG. 1 are realized through the Fibre Channel switch fabrics 206, the connections 208 to those switch fabrics, and the software programs on the devices that utilize the hardware connections. The QoS control is an application running on a computer 210 which is also attached to the Fibre Channel fabric.

Configuration Phase

Figure 3:
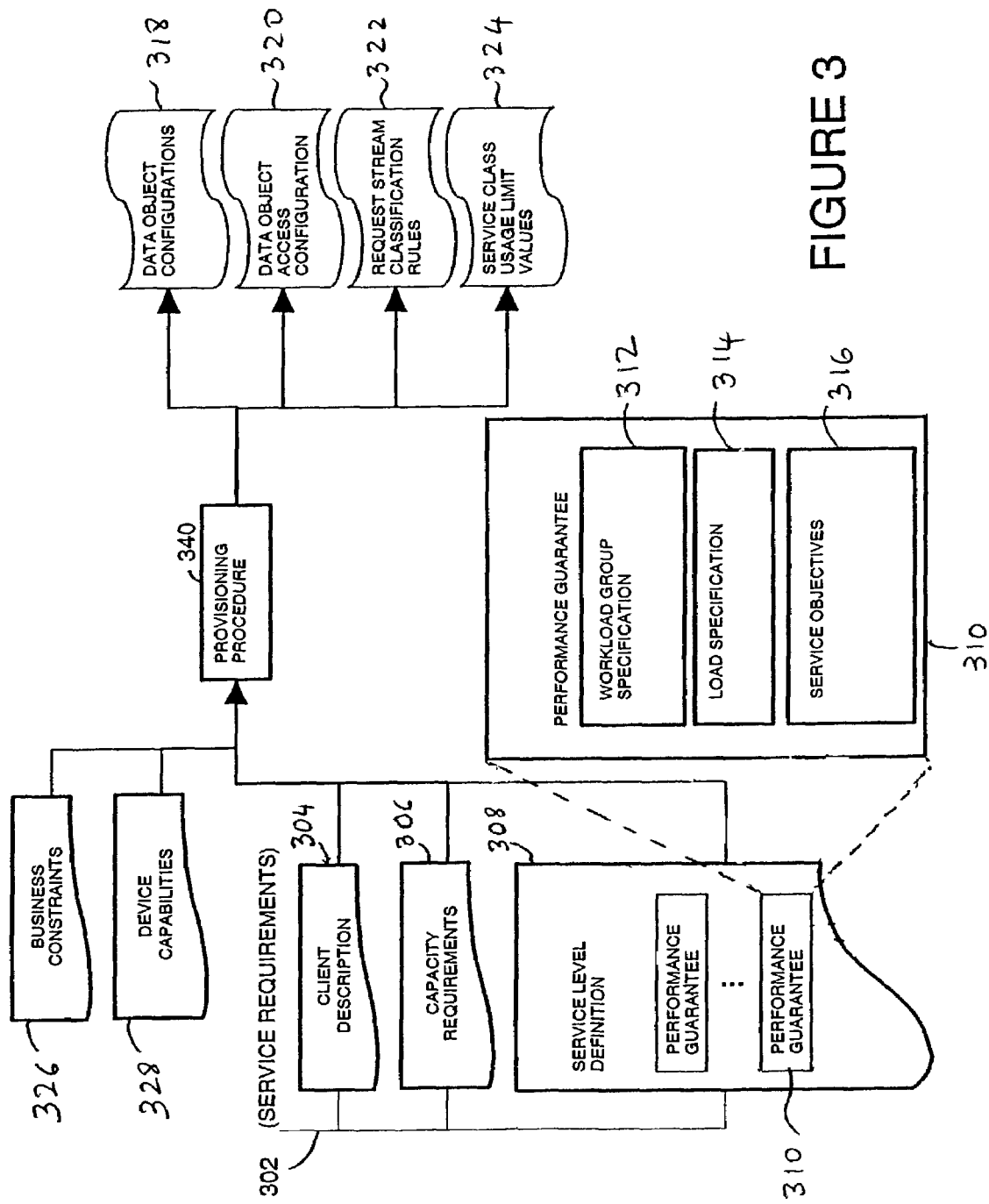
FIG. 3 is a diagram showing the input and output of the provisioning process of the invention.

Before it is used, the system must undergo a configuration process described in FIG. 3. This configuration process takes as input the requirements for the system 302, including the client description 304, the capacity requirements 306, and the service level definition 308, which are described below. The configuration process determines the system operational parameters that meet the system requirements and the constraints implied by business needs and device capabilities.

The client description 304 identifies each client and defines the values of attributes needed for the process described below. The capacity requirements 306 specify the data objects (such as SCSI-3 logical units), the size of each, and the level of access of each client to each data object.

The service level definition 308 consists of a set of performance guarantees 310 that are to be honored by the system. Each guarantee consists of a workload group specification 312, a load specification 314 and the service objectives 316. A workload group is a set of request streams between clients and data objects, and the workload group specification 312 defines it by identifying each request stream with the client and data object for each stream. The load specification and service objectives specification together define the quality of service that is guaranteed for the workload group. In a manner detailed below, the load specification defines the rate and types of requests that are to be admitted for service, and the service objectives specification contains the response-time objectives that the storage system must meet whenever the limits defined by the load specification are not exceeded. The guarantee is considered to have been honored if either the service objectives are met by the system or the load limits have been exceeded by the clients.

The load specification 314 contains, specifically, the maximum number of requests per second to be serviced for the workload group, and the maximum number of bytes to be contained in the data transfers for those requests, as well as a limit on the burst rate, defined as the number of requests submitted within any time window of a specified duration. A representative choice of burst window duration is 100 milliseconds. The load specification also may include other optional limit values. The other limit values, if present, provide additional knowledge about the request stream that may be used in the configuration process to construct a less expensive system that honors the performance guarantees. In a preferred embodiment of the invention, these other limit values may include:

Separate limits on the rate of read requests, write requests, bytes read, and bytes written per second Limits on the number of requests that may be in process at any time, and on the number of bytes to be transferred in those requests Limits on the rate of read requests and write requests which are not serviced as cache hits Limits on the rate of read and write operations that are not address-sequential according to any of several criteria, with a separate limit for each criterion. The criteria for sequentiality of a request are:

Direct sequential: The request's start address immediately follows the end address of the request immediately preceding, and the request is of the same type (read or write)

Skip sequential: The request's start address is within a fixed range following the end address of the request immediately preceding, and the request is of the same type (read or write)

Group sequential: The request is a skip-sequential match to any request in the sequentiality group, which contains the attributes of a fixed number of recent requests, including the most recent request. A representative choice of sequentiality group size is eight. After a request is serviced, it is inserted into the sequentiality group, replacing an earlier request contained in the group. If the new request had a skip-sequential match with a group member, that member is the one replaced. If not, the member is the one replaced.

Any request that is direct sequential is also skip sequential, and any request that is skip sequential is also group sequential. Thus any request that is counted against the limit on non-skip-sequential operations is also counted against the limit on non-direct-sequential operations, and it would therefore not be useful to specify a limit on non-skip-sequential operations which is greater than the limit on non-direct-sequential operations.

The exact meanings of the cache-miss limits and the limits on nonsequential requests are described below in reference to FIG. 10.

The values in the load specification are directly related to conventional metrics by which request streams are characterized in the existing art, and one skilled in the art can derive them from those metrics. As an illustration, it might be that a request stream limited to 1,000 operations per second, has a read/write ratio between 70/30 and 60/40, has an average request size no greater than 8,000 bytes, has enough access locality such that a read cache hit ratio of at least 80% occurs, and is 90% direct sequential in write traffic. Then any or all of the following limits could be set for it in the load specification:

requests per second limited to 1,000
bytes per second limited to 8,000,000 (which equals 1,000× 8,000)
reads per second limited to 700 (which equals 1,000×70%)
read bytes per second limited to 5,600,000 (which equals 1,000×70%×8,000)
writes per second limited to 400 (which equals 1,000×40%)
write bytes per second limited to 3,200,000 (which equals 1,000×40%×8,000)
read cache misses limited to 140 (which equals 1,000×70%× (100% −80%))
non-direct-sequential write operations limited to 40 (which equals 1,000×40%×(100% −90%))

The service objectives 316 contain the performance targets based on the distribution of the response times for requests in the workload group. In the preferred embodiment this consists of the mean response time for all requests. In alternate embodiments it may also include the target maximum percentage of requests whose response time exceeds a specified threshold, for which threshold a representative value would be 100 milliseconds. It may also include the target mean response time for specified subsets of requests, such as direct-sequential write operations.

The configuration process supplies the service requirements 302 as described above and, in addition, the business constraints 326 and device capabilities 328 to the provisioning procedure 340. The device capabilities express what performance can be expected, with what level of confidence, from each of the available storage devices when presented with a workload of specified characteristics. The business constraints express the range, costs, and acceptability of different options for obtaining and installing additional equipment, as well as the relative value of accepting the performance guarantees.

The provisioning procedure 340 is a method for determining a configuration of the storage system, possibly with the addition of equipment, that meets the service requirements within the business constraints and device capabilities, or reports that it cannot find such a configuration. A suitable provisioning procedure can be derived by one skilled in the art from any available procedure in the existing art that accepts workload specifications and performance requirements and determines storage system parameters.

The provisioning procedure supplies expected load values to the available procedure equal to the controlled-worst-case load, which is determined from the load specifications contained in the service level definition. The controlled-worst-case load is the most intense load that may be submitted to the storage system for each workload group after the system has been configured with limits on the flow controller so that the load does not exceed the load specifications. The controlled-worst-case load has average usage equal to the limit value for each metric, but also has the maximum fluctuation in request submission rate within a measurement interval that is permitted by the burst rate limit. It is assumed that the upward fluctuations of different workload groups occur simultaneously, so that the maximum burst rate expected for the whole system equals the sum of the burst rate limits of the workload groups. The controlled-worst-case load is used as the expected load that is supplied to the available procedure.

The output generated by the provisioning procedure include the data object configurations 318, the data object access configuration 320, the request stream classification rules 322, and the service class usage limit values 324. The data object configurations specify how the storage system 101 must be configured including, for example, what logical disks of what RAID level are to be created using which physical disk drives. The data object configurations are applied to the corresponding storage devices in the storage system.

The data object access configuration specifies which clients 100 should access which data objects via which gateway connections 108, and is applied to the gateways in the form of access control instructions and to the switch fabrics or other network devices in the form of zoning instructions.

The request stream classification rules 322 consist of the classification rules (128 in FIG. 1) to be supplied as needed to the request classifier. They specify what service classes 120 are to be used, and which combinations of gateway connection, data object, and request attributes are mapped into each service class. The request stream classification rules are applied to the QoS server and from it as necessary to each classifier in the gateways. The service class usage limit values specify for each service class 120 what maximum usage rate is to be permitted regarding each variable for which a limit is specified in the load specification 314. The service class usage limit values are applied to the QoS server and from it as necessary to each flow controller in the gateways. These values determine the contents of the replenishment rate vector 124 and the carryover limit vector 126 for each service class 120.

In a preferred embodiment of the invention, the provisioning procedure 340 may be performed manually by those skilled in the art using best engineering practices in reference to documented and tested performance properties of the available storage devices. The existing art is sufficient to determine the data object configurations 318 and the data object access configuration 320. The request stream classification rules 322 are derived from the service level definition, by creating a service class for each workload group specification 312, and by defining classification rules for the service class to select each request stream specified in its workload group specification. The request stream specification is converted to a classification rule by replacing the data object identity with the addressing information for that data object contained in the data object configurations 318. The service class usage limit values 324 are derived directly from the load specification 316 contained in the performance guarantee 310 which includes the workload group specification 312 associated with the service class.

Alternate embodiments may use automated procedures, such as the provisioning procedure described in U.S. Pat. No. 6,119,174. These embodiments may have the advantage of making more effective use of the information contained in the load specification so as to determine a less costly system that honors the same performance guarantee, or so as to succeed at honoring guarantees within constraints where a less effective embodiment might report that it cannot find a successful configuration. In addition, alternate embodiments may be able to support a larger set of targets that can be set in the service objectives.

Operation Phase

When the outputs (318–324) of the provisioning procedure have been applied to the system, the configuration process of FIG. 3 has been completed, and the system may be operated. At this point, the gateways (202 and 204) and QoS control elements (210) of the system have been configured so that the resource usage by each request stream does not exceed the usage limits determined in the configuration process. During operation, the classifier and flow controller (parts of the gateways 202 and 204) together ensure that the limits are not exceeded. A preferred embodiment of this process is illustrated by the flowcharts of FIGS. 4–10.

In this process, the classifier first assigns each request 102 to a service class 120 which is managed by the flow controller. The service class 120 is associated with a balance vector 122, a replenishment rate vector 124, and a carryover limit vector 126. Each of the vectors contains a numerical value associated with each resource whose usage is controlled. The balance vector value of a service class denotes a level of credit defining how much usage of the associated resource can be performed immediately without causing the usage limit to be exceeded. A request is admitted into servicing by the storage system only when the balance vector values exceed the predicted resource usage of that request, and for each request that is admitted into servicing the balance vector values are reduced by the request's resource usage. The balance vector is periodically incremented in proportion to the replenishment rate vector, whose values are equal to the usage limits of the associated resources for this service class. Each balance vector value is limited to the corresponding carryover limit vector value.

The carryover limit value is set to the usage limit of the associated resource for the service class, multiplied by the measurement time over which the average usage rate is required to be below the stated limit. A representative value of that measurement time is 100 milliseconds. Appropriate choice of the carryover limit value is necessary for the system. A value of zero would imply that all requests are delayed until the next replenishment time before they are serviced, which would itself be an unacceptable performance degradation. A too-large value would permit large fluctuations in the usage rate and possibly an unacceptable impact on other clients.

Figure 4:
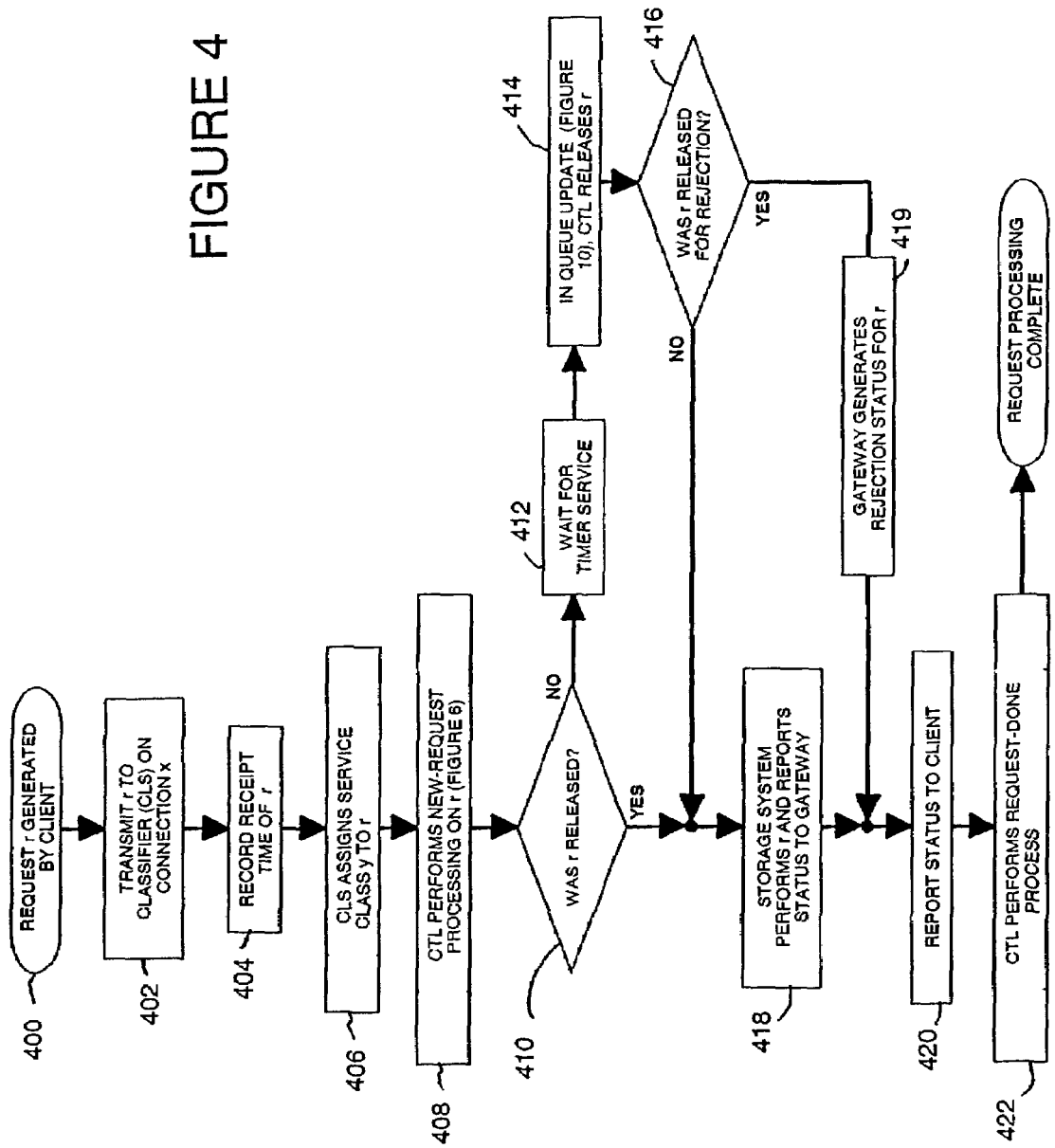
FIG. 4 is a flow chart of a preferred embodiment for processing an I/O request by the system of the invention.

The preferred steps used by the system in processing a request from a client are shown in FIG. 4. The request is generated by the client (step 400) and transmitted to the gateway 110 (step 402) via a gateway connection. The arrival time of the request is recorded by the gateway (step 404), and control of the request is given to the classifier 112. The classifier 112 uses the identity of the gateway connection 108 and the attributes 106 of the request to assign it to a service class (step 406), via a procedure described below in reference to FIG. 5, and then gives control of the request to the flow controller. The flow controller 114 uses the request attributes and service class to determine whether the request can be processed immediately without exceeding the usage limits (step 408), via a procedure described below in reference to FIGS. 6, 9 and 10. If necessary, the request is held in a delay queue (step 412), to be released either when its servicing would fall within usage limits, or when the service time limit for the request has expired, via steps described below in reference to FIG. 10. If and when servicing is permitted within usage limits, the request is forwarded to the storage system for servicing (step 418). Upon completion of servicing, notification is sent to the client (step 420). Then the flow controller records the completion time and updates its monitoring and control statistics (step 422), via the process described below in reference to FIGS. 8 and 10.

Figure 5:
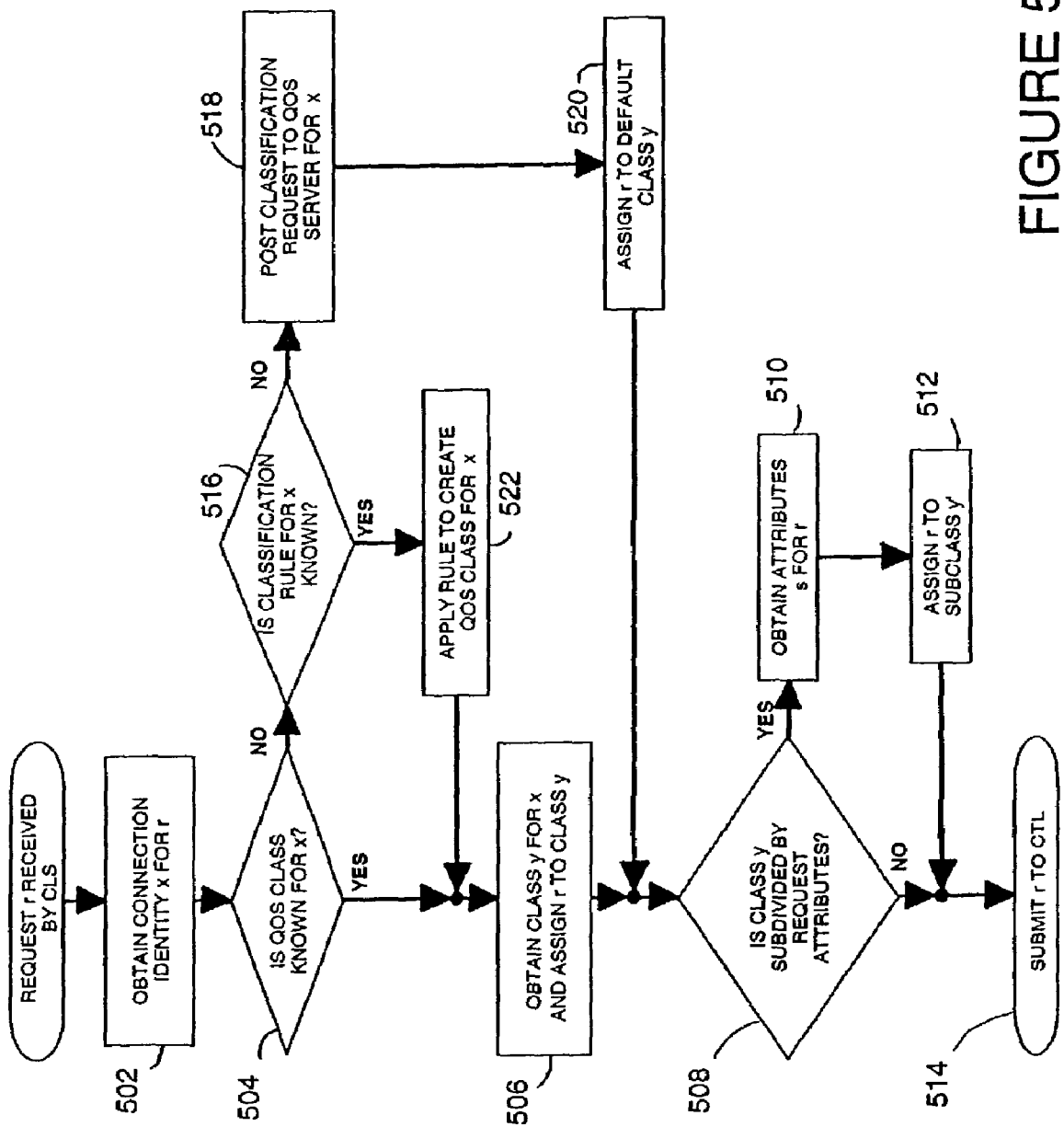
FIG. 5 is a flow chart of a preferred embodiment for processing an I/O request by the request classifier (CLS) of the invention.

The classification process is illustrated in FIG. 5. The classifier 112 determines the identity of the client-to-gateway connection 108 via which the request was submitted (step 502), and performs a table lookup to determine the corresponding service class 120 (step 504). In many preferred embodiments this lookup is combined with the lookup required to associate the request with the data object on which it is to be performed, so the run-time cost is minimal. In most cases, the connection has an associated service class, and the request is assigned to this service class (step 506). Then the classifier determines whether the mapping is to be changed according to the attributes 106 of the request. If it is not to be changed, the classification process has already been completed. If it is to be changed, the attributes are examined (step 510) and the new service class is obtained from the attributes and the initial service class (step 512).

If at step 504, the association of the connection identity to a service class is not known at the gateway, this is resolved in a two-level process. The classifier determines whether the gateway contains a pattern-matching rule that can generate this association (step 516). If it does, the association is generated, which may entail creating a new service class and assigning it control values according to the rule (step 522). If no such rule is found, the QoS server is informed of the missing association (step 518), which leads to a resolution via steps described below in reference to FIG. 11. The request is not delayed for this resolution. It is assigned to a default service class (step 520) and subjected to steps 508 and following.

Figure 6:
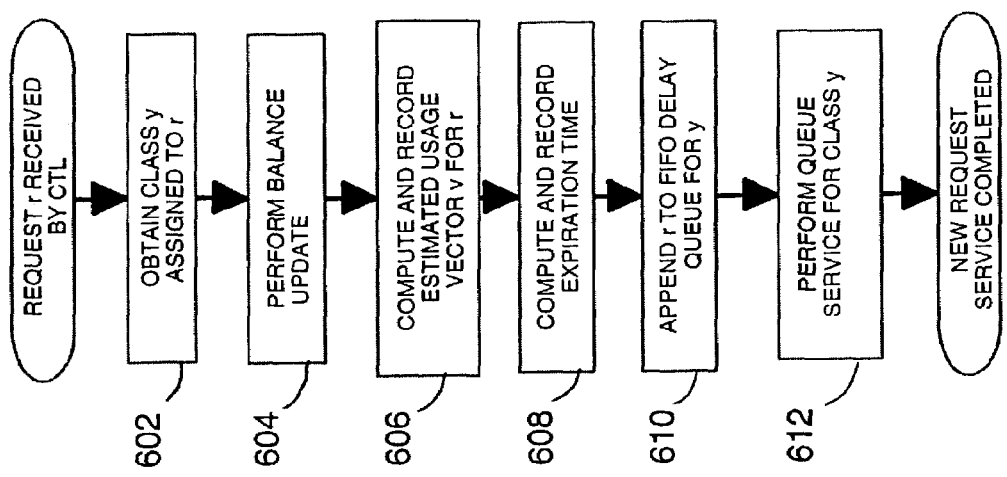
FIG. 6 is a flow chart of a preferred embodiment for processing a new I/O request by the flow controller (CTL) of the invention.

The next operations of the process are illustrated in FIG. 6. When the flow controller 114 is given the request, it first inspects the variables to determine the service class assigned to the request by the classifier (step 602). Then the flow controller 114 ensures that the balance vector 122 for the service class 120 has been updated to accurate values (step 604), via steps described below in reference to FIG. 9. It then computes the cost vector of resource usage expected for the servicing of the request, and records it with the request (step 606). An expiration time for the request is computed by adding the maximum hold time for the service class to the arrival time of the request, and recording it with the request (step 608). The request is then appended to the delay queue 129 for the service class 120 (step 610). The flow controller 114 then releases those queued requests whose service is possible within usage limits to the storage system (step 612) in accordance with the process shown in FIG. 10.

If the request 102 has been kept in the delay queue 129, its release from the queue will be triggered by the balance-update and queue-service procedures, which are invoked either from the arrival of a new request or by a periodic service call to the flow controller 114 within the gateway 110. The periodic call is invoked at a fixed rate within the gateway 110, with a typical period of 10 milliseconds. The periodic call procedure is illustrated in FIG. 7.

Figure 7:
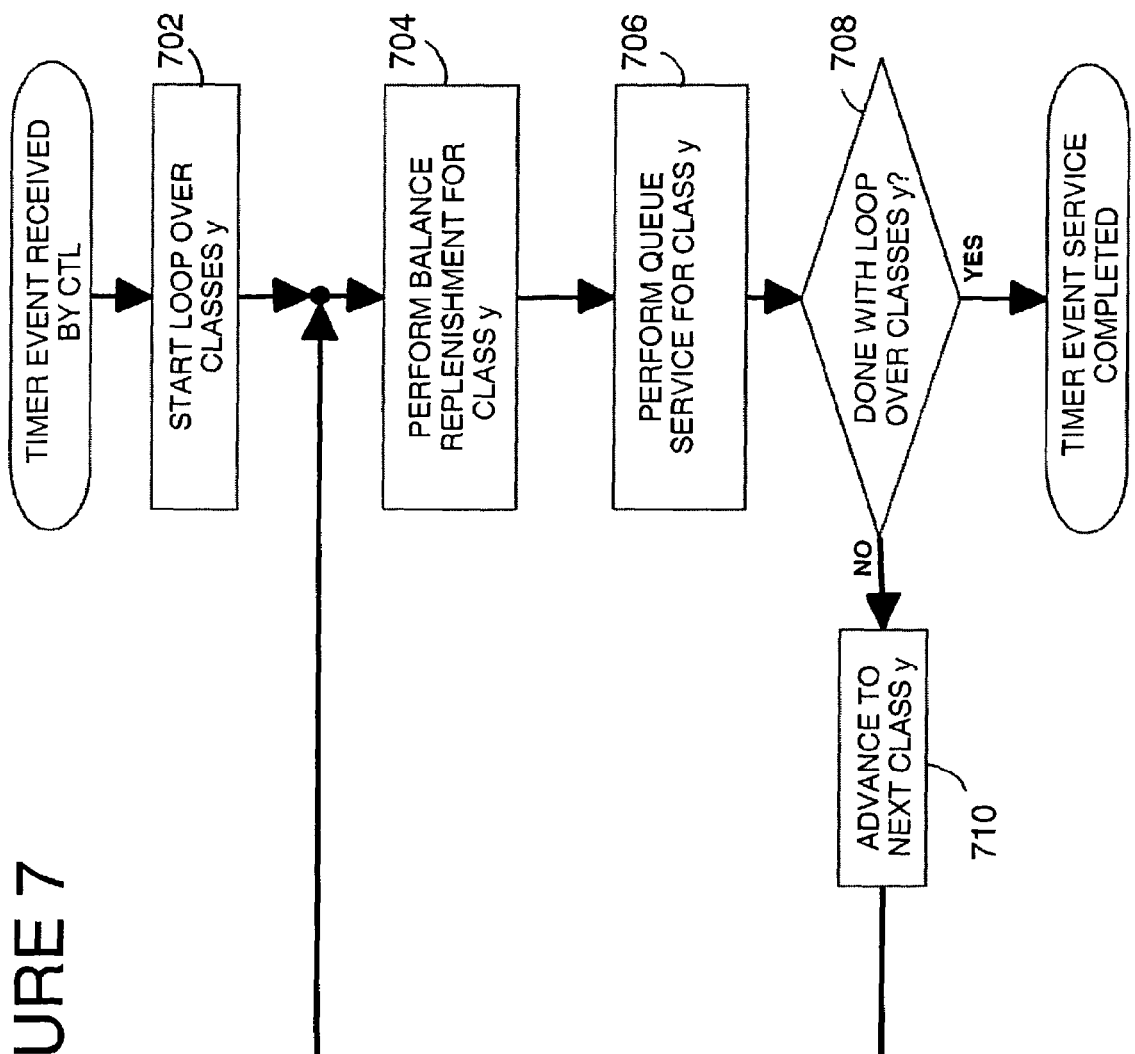
FIG. 7 is a flow chart of a preferred embodiment for the process of periodic servicing of the flow controller.

Referring to FIG. 7, the flow controller 114 first initiates a program loop to address each service class 120 that may need updating (step 702). For each such service class, the flow controller 114 performs the balance update procedure (step 704), as described in detail below in reference to FIG. 9. The flow controller 114 then performs the queue update procedure (step 706), as described below in reference to FIG. 10. After determining that all such service classes have been thus addressed (step 708), the flow controller 114 completes the periodic service call. The periodic service procedure may be made more efficient in several ways. A service class need not be addressed at all unless it has requests in its delay queue, provided the balance update procedure is implemented correctly to span multiple replenishment intervals. Also, the queue update procedure need not be invoked on a service class for which no balance update has been performed.

Figure 8:
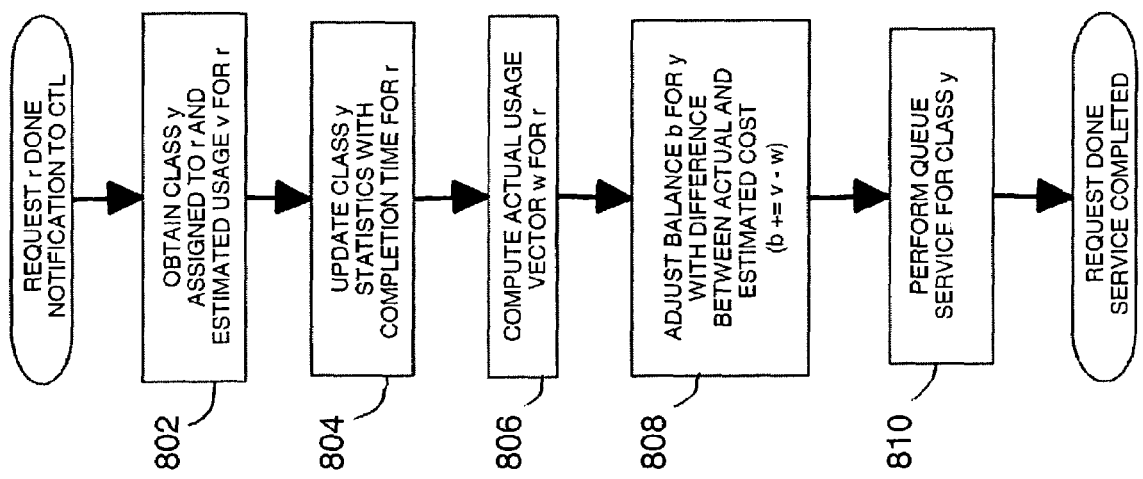
FIG. 8 is a flow chart of a preferred embodiment for the I/O request completion process by the flow controller.

After a request 102 has been serviced by the storage system 101 and the client has been so notified, its service class 120 is updated by the flow controller 114 via steps illustrated in FIG. 8. The flow controller 114 reads the assigned service class and the estimated resource usage with which the initial dispatch decision was made (step 802). It then notes the completion time of the request and computes the response time as the completion time minus the receive time, and updates the summary statistics for the service class (step 804). The flow controller 114 then computes the actual resource usage with information derived from the response time and service history of the request (step 806). For example, the response time indicates whether the request was most likely a cache hit, and the actual usage value for cache-miss resource is set accordingly. If the actual usage values differ from the estimated resource values, the balance vector is updated with the correction (step 808). In addition, parameters used in determining the predicted usage, such as the current cache-hit ratio, may be adjusted. If an adjustment has been made that increases a balance vector value, the queue-update procedure is performed to determine whether additional requests are to be released from the delay queue (step 810).

It is not required that the actual usage vector represents a precise determination of the resource usage for the request. If specific limits have not been set on cache-miss usage then a workable system can define actual usage to be equal to estimated usage, so that steps 804 through 810 can be bypassed.

Figure 9:
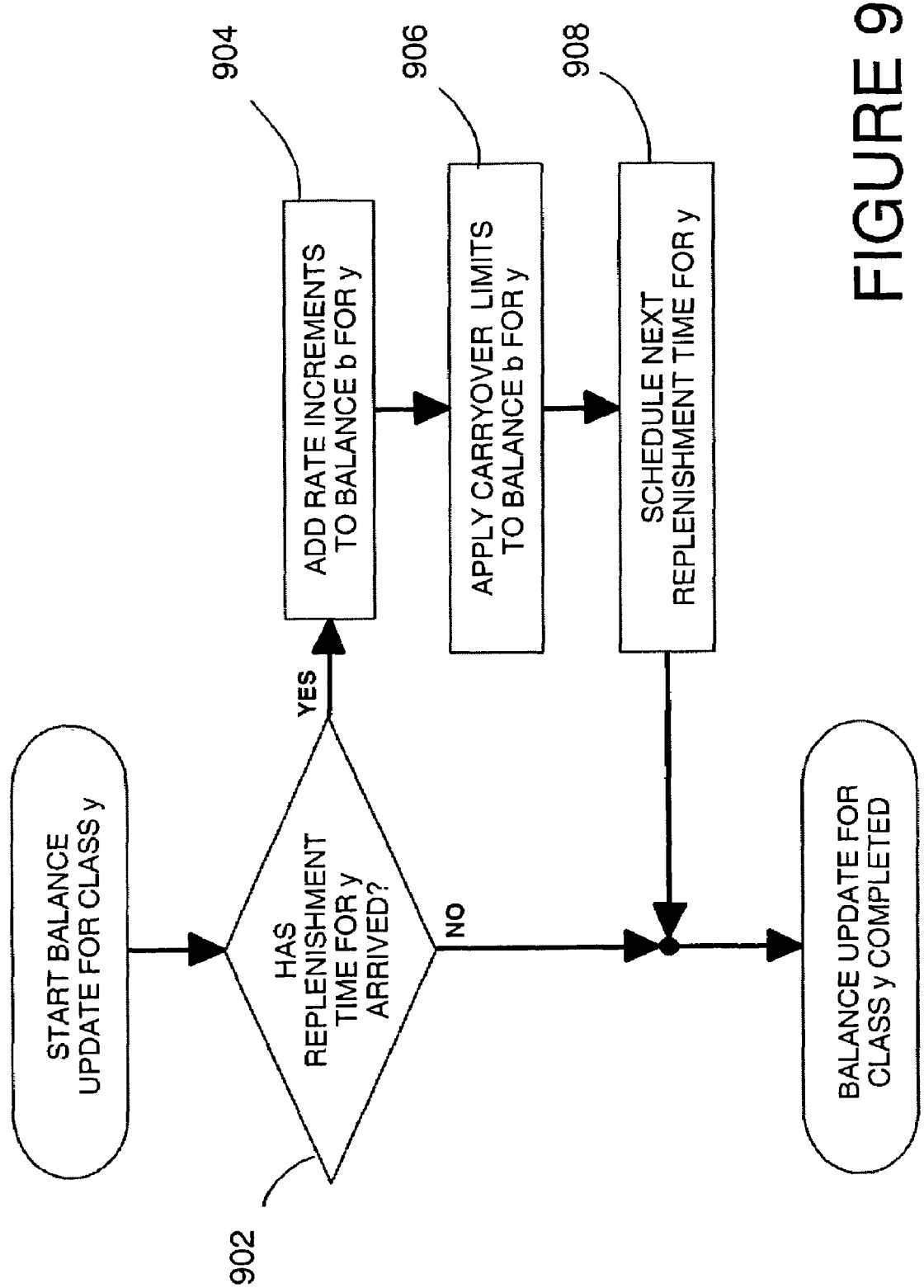
FIG. 9 is a flow chart of a preferred embodiment for the balance update process in the flow controller.

The balance update procedure for a service class referenced above is shown in FIG. 9. The flow controller 114 determines whether the next scheduled replenishment time has arrived (step 902) and, if not, takes no further action. If the replenishment time has arrived, the flow controller 114 adds the rate increments contained in the replenishment vector 124 to the balance vector 122 for the service class (step 904). The balance vector values are reduced as necessary to be no greater than the carryover limit vector 126 (step 906). In some preferred embodiments, the amount by which the values are reduced is recorded for adjustment of the replenishment rate vectors or balance vectors of the service classes in the system, but in the simplest embodiment these amounts are ignored. The flow controller 114 then determines the next replenishment time (step 908).

Figure 10:
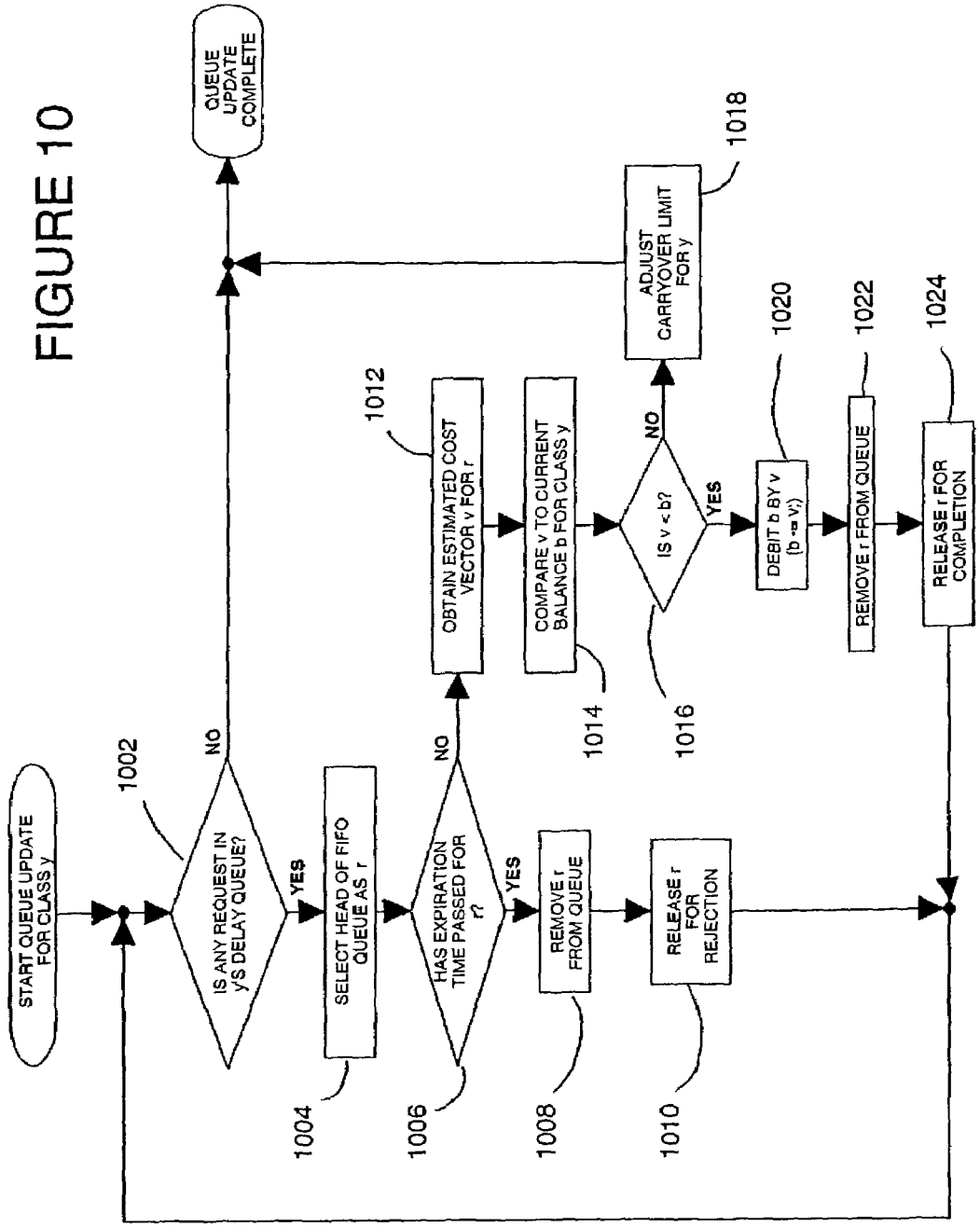
FIG. 10 is a flow chart of a preferred embodiment for the queue service process in the flow controller.

The queue update procedure for a service class referenced above is represented by the flowchart in FIG. 10. First, the flow controller 114 determines whether any requests are in the delay queue 129 (step 1002) and, if not, takes no further action. If any request is in the queue then the head-of-queue request is addressed (step 1004). The request's expiration time is examined (step 1006). In most cases this time has not passed. Then the estimated usage vector is read from the request's variable data (step 1012) and compared with the balance vector for the service class (step 1014). If for any usage-controlled resource the estimated usage value of that resource is greater than the balance vector of that resource, the request is not yet ready for service. Then the request is left in the queue, and the carryover limit is adjusted to equal the base carryover limit plus the estimated cost of the request (step 1018), and the queue-update procedure is completed. In the other case of the resource comparison, the balance vector values are reduced by the expected usage of the request (step 1020), the request is removed from the delay queue (step 1022), and the request is released for completion (step 1024). This release will cause the request to be forwarded to the storage system for servicing (step 418). At this point the procedure returns to step (905).

If in step 1006 it is found that the expiration time has passed, the request is removed from the delay queue (step 1008) and the request is released for rejection (step 1010). A notification is generated that the request has been rejected (step 419) and sent to the client (step 418), and the storage system is not invoked for service. In the preferred embodiment in a Fibre Channel SCSI-3 system, the rejection notification to the client consists of an FCP_RSP frame containing a SCSI status of either BUSY or TASK SET FULL according to a parameter set by the system owner. In an alternate embodiment, the rejection of a request by expiration of its hold time may cause all requests in the delay queue to be rejected. In another alternate embodiment, a timed-out request is serviced by the storage system, with appropriate adjustment of the balance vector, and other requests to the same service class are rejected promptly on arrival with SCSI status of TASK SET FULL until the balance vector values indicate that further requests may be processed.

In a preferred embodiment of the invention, the request stream classification rules (322 in FIG. 3) and the service class usage limit values (324 in FIG. 3) are not immediately applied to the gateways before operation is begun. Instead, they are applied to the QoS server, to which each gateway has a connection. This information is applied to the gateways on demand. Specifically, when a gateway determines that the service class for a request is not known by the gateway, it posts a notification to the QoS server (518 in FIG. 5). When the notification has been received the QoS server sends the applicable classification rule and the usage limit values for the service class to the gateway. This process enables easier system administration, as each gateway need not be fully configured before operation. With such an embodiment, the performance guarantees (310 on FIG. 3) specify a length of a transient period (typically less than one minute) following the onset of I/O operations in a given service class, during which it is not required that the performance objectives for that service class need to be met.

Figure 11:
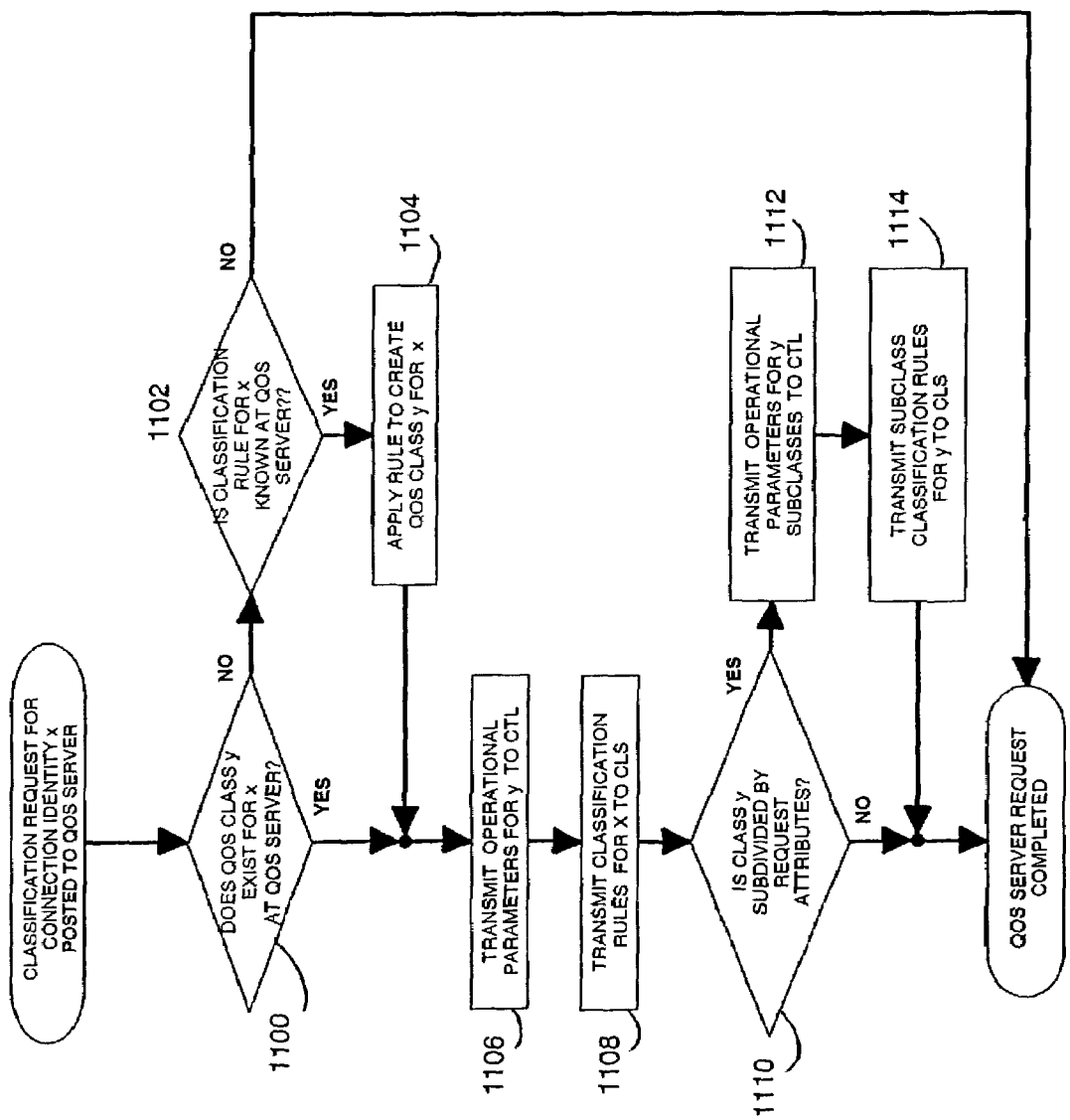
FIG. 11 is a flow chart of a preferred embodiment for the distribution of configuration information to the classifier (CLS) and flow controller (CTL).

This process by which this is done is illustrated in FIG. 11. The QoS Server determines whether a service class matching the supplied connection identity has already been defined (step 1100); this typically involves reference to a database of created service classes. If no such class is found, the QoS Server determines whether a classification rule exists by which a new service class matching the supplied connection identity can be produced (step 1102). If not, then the QoS need perform no further action and the process s complete. If a production rule is found then the service class is created within the QoS server (step 1104) and the process continues with step 1106. If the matching service class had already existed, then step 1100 would be followed immediately by step 1106.

In step 1106, the control parameters of the service class are transmitted to CTL. These parameters include the replenishment rate vector (124 in FIG. 1) and the carryover limit vector (126 in FIG. 1). Then a classification rule is transmitted to CLS that causes the specified connection identity to map to the new service class (step 1108). The notification to CTL must precede the notification to CLS to ensure that CTL does not receive any requests assigned to a service class for which it does not hold the operational parameters.

The QoS Server determines whether a sub-classification of requests associated with the specified connection, based on request attributes (106 in FIG. 1), is to be applied (step 1110). If so the operational parameters for the subclasses are transmitted to CTL (step 1112) and the classification rules by which requests are assigned to subclasses are transmitted to CLS (step 1114). After these steps, the QoS Server request process is completed.

Performance

The operation of the invention controls the load presented to the system so that the accepted guarantee is honored for every workload group. This depends upon several aspects of the system. First, the long-term average load of requests issued to the storage system for a given service class, measured using the usage metrics to which usage limits are applied, is not greater than the usage limits for that service class. If for a single service class and a single usage metric j, the actual and expected usage in servicing request r are represented by $w_{jr}$, and $v_{jr}$, respectively, and the balance vector value for metric j is $b_j(t)$ at a time t, then the following equation holds for the inventive steps described above:

$$0 \le b_j(t) \le r_j t - (\Sigma_{r \in S(t)} W_{jr}) + (\Sigma_{r \in A(t)}(W_{jr} - V_{jr}))$$

where S(t) is the set of all requests submitted to the system for servicing by time t, A(t) is the set of all requests actively being serviced at time t, and the replenishment rate is $r_j$. In the long term average, the set of active requests A(t) has a negligible effect compared with the total requests submitted S(t). The long term average usage rate would be:

$$<(\Sigma_{r \in S(t)} W_{jr})/t> \le r_j.$$

Secondly, the usage rate may briefly fluctuate above and below the usage limit, since requests arrive as fluctuating discrete events rather than as a continuous process. However, the fluctuations are within the acceptable range within which guaranteed performance is maintained. These fluctuations were accounted for in the configuration phase.

Since the total load is not above the limits for which the system was provisioned in step 340 of FIG. 3, the response time of the storage system itself is within the design requirements submitted at that step.

In a given measurement period, the response time objectives are being met for those workload groups whose requests are not being held in the delay queue (129 in FIG. 1) following step 408 of FIG. 4. The requests for these workloads are experiencing a response time, viewed from the client, equal to the storage-system response time plus the normal service latency of the gateway. Since the design requirements input to the provisioning procedure 340 corrected for that service latency, this response time meets the service objectives 316 contained in the corresponding performance guarantee, so the performance guarantee is being honored.

Further, in a given measurement period, the performance guarantee is being honored for those workload groups whose requests are being held in the delay queue following step 408 of FIG. 4. There are two cases to address. Usually, requests are held because the request rate exceeds the limit contained in the load specification, so the performance guarantee is honored even if the service objectives are not met. However, it may happen that some requests submitted in a short burst may have their servicing delayed, but because no further requests are submitted the average usage in the measurement period is below the limits in the load specification. This describes, for this workload group, the worst-case accepted load described in connection with the provisioning procedure 340 in FIG. 3. Because this worst-case load is accommodated by design in the provisioning procedure, the service objectives are met even for this case.

As an example, suppose a storage system is capable of servicing 30,000 random reads or writes per second of size 4096 bytes each with a mean response time of 40 milliseconds. Then the limits for one client A may be set at 20,000 operations per second and 81,920,000 bytes per second, and another client B may have limits set at 10,000 operations per second and 40,960,000 bytes per second, and each can be offered a performance guarantee based on the 40-millisecond response time for the system. These limit values, chosen arbitrarily for illustration, may be different because client A is performing more important work, or because client A has paid more for a higher level of service. The guarantee to each client is conditional upon the amount of utilization by that client: the mean response time of a client's requests will be below the target value, provided that the client performs fewer than the number of operations per second specified by the limit.

In this example, the classifier is configured to assign client A and client B to separate service classes, and the flow controller is configured to apply the limits above to their respective service classes.

Assume that client A and client B both attempt to perform 18,000 operations per second. The attempted load on the system of 36,000 operations per second exceeds what it can deliver at a response time of 40 milliseconds. Without the invention, the full load would have been presented to the system, and this would have led to a highly degraded response time. The conditional performance guarantee to client A would have been violated. With the invention in place, client B's operations would be delayed so that only 10,000 of them are submitted to the system per second, while client A's operations are passed without delay, making a total load on the system of 28,000 operations per second. Client A experiences a response time less than 40 milliseconds because the system is handling load below 30,000 operations per second. Client B's response time is the sum of the underlying system response time (<40 milliseconds) and the amount each operation is delayed, which depends on the details of how these operations are generated by client B. This total response time is greater than the response time would have been for client B without the invention, but this is acceptable because the conditional guarantee for client B only permits 10,000 operations per second. For both clients, the conditional performance guarantee is met.

The preferred embodiments described above assume a conservative approach to provisioning, in which the system is configured to deliver acceptable performance under the worst-case loads possible within the limits contained in the load specifications. This approach gives maximal confidence of honoring the offered guarantees, which is appropriate if the cost of breaching an offered guarantee is very high. However, in some situations it may be considered wasteful to provision for a controlled-worst-case combination of load fluctuations that is highly unlikely. The over-provisioning can be reduced when limits are set appropriately, in particular when the burst rate limit can be set not much greater than the average rate limit. Also, the over-provisioning is much less costly than provisioning for the true worst case load in the absence of the flow controller disclosed by the invention. Nevertheless, in some cases a second embodiment that involves some risk of breaching a guarantee is preferable.

Request Regulation Based On Statistical Risk Acceptance

In another preferred embodiment of the invention, the content of the service level definition 308 and provisioning procedure 340 in the configuration phase are different, in a way that permits a less conservative and more economical configuration to be used. With reference to FIG. 3, each performance guarantee 310 contained in the service level definition 308 still consists of a workload group specification 312, a load specification 314 and service objectives 316. The load specification contains the data described in the above embodiments and a statistical characterization of the expected variations in the load. The service objectives do not specify absolute requirements but instead contain targets the attainment of which leads to a reward to the system owner. They can equally well specify that failure to attain a given target causes the system owner to incur a financial penalty. The rewards and penalties may be progressive, so that a marginally improved performance leads to a marginally increased reward by a formula specified in the performance guarantees. The system owner may choose to formulate the performance guarantees so that the rewards and penalties contain not only the financial effects of incurring contractual penalties but also the estimated value or cost of intangibles such as customer goodwill.

For this system the goal of the system owner is to increase the expected net benefit obtained through these rewards and penalties having subtracted the cost of constructing and operating the system. In order to increase the likely net benefit, the system owner is willing to accept risk that unlikely variations in load might arise that reduce the rewards or increase penalties. By evaluating the possible rewards and penalties, the system owner chooses the maximum acceptable probability that the targets are not attained, and the system is designed for this rather than with controlled-worst-case values.

The provisioning procedure supplies an expected load to the available procedure equal to the controlled-expected load determined from the service level definition. The controlled-expected load has average usage equal to the average values contained in the load specification. The load fluctuations for the controlled-expected load are taken to be characterized by the statistical data contained in the load specification and as limited by the burst rate limit. The variability of the total load is determined by compounding the fluctuations using standard statistical methods under the assumption that fluctuations for different workload groups are uncorrelated. The peak load for which to design the system is chosen so that the probability it will be exceeded, indicated by the compounded probability distribution, is less than the maximum acceptable probability for missing targets.

The subsequent operations in this embodiment are the same as those in the above preferred embodiments. The provisioning procedure determines the system configuration parameters, which are installed in the system, and the operating phase of the system is identical to that of the preferred embodiment. For some situations, this embodiment performs better than the other preferred embodiments. For a given set of burst rate limits, the design peak load for this embodiment can be much less than the design peak load for the controlled-worst-case load of the preferred embodiment, although the expected average load is the same. This means a less expensive system is capable of handling the load, because of the system owner's acceptance of risk. Alternatively, for a given system, this embodiment permits more generous burst rate limits to be specified for the individual workload groups, because the likelihood is very small that all workloads will exhibit simultaneous bursts.

A Preferred Embodiment as a Switch Device

In the preferred embodiments described thus far, it is assumed that the classifier 112 and flow controller 114 are parts of a gateway that is a full SCSI-3 device. The gateway fully receives and responds to the requests it receives. It generally services them by invoking requests to the storage system, itself acting as a proxy for the client, and receives the response from the storage system. An important aspect of such a configuration is that the data flowing between client and storage system for each request is stored into memory on the gateway as an intermediate step of request servicing, and read out from that memory during the servicing. This data traffic introduces a potential bandwidth bottleneck and an added latency that is not essential to the operation of this invention.

Figure 12:
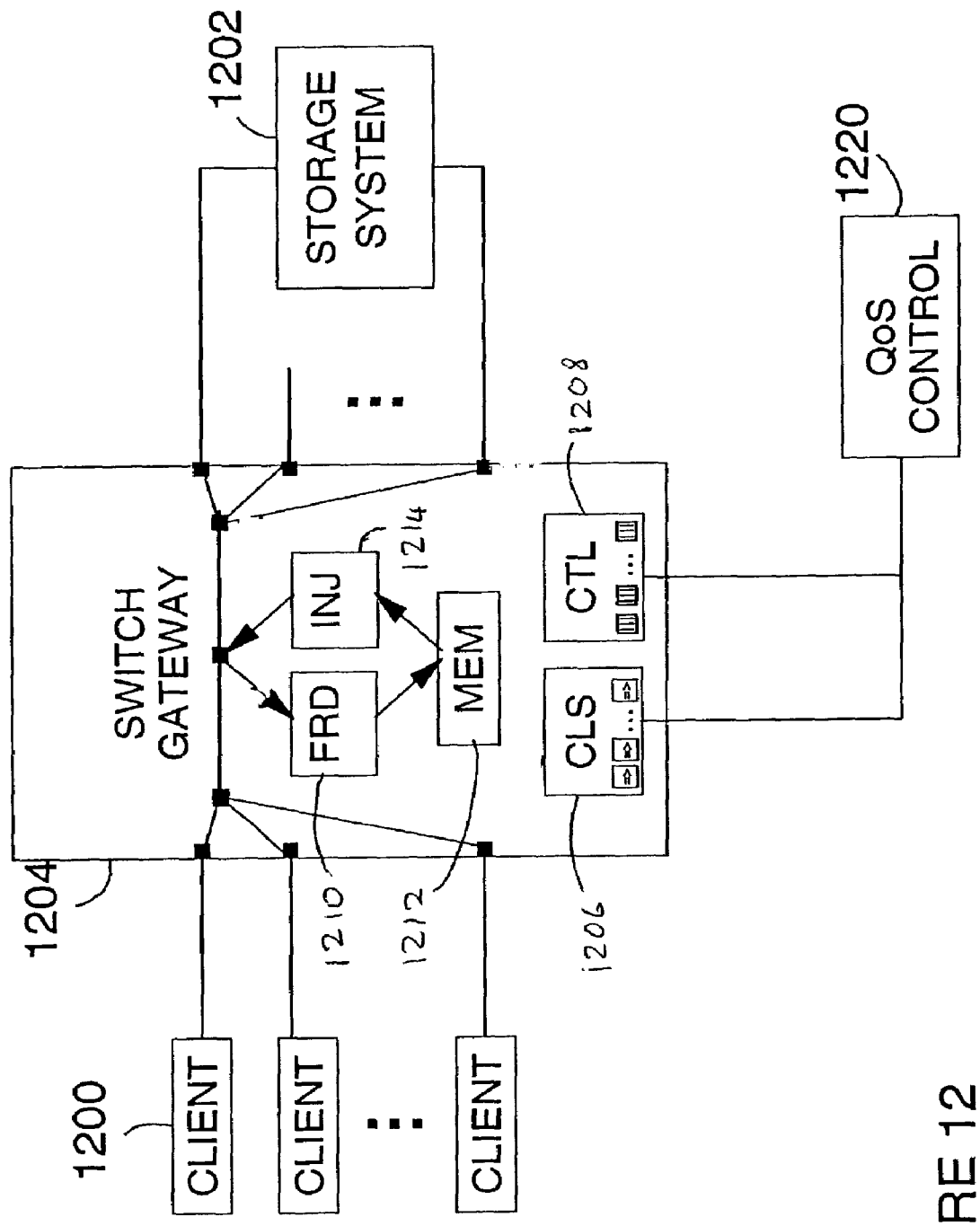
FIG. 12 is a schematic diagram showing a preferred embodiment of the invention as a switching device in a Fibre Channel networked storage system.

An alternative embodiment, denoted the switch embodiment, is illustrated in FIG. 12. The system consists of clients 1200 and a storage system 1202, and one or more switch gateways 1204 containing the capabilities of the classifier 1206 and flow controller 1208, similar to the classifier 112 and flow controller 114 in FIG. 1. In addition, the switch gateway 1204 contains a frame re-director 1210, a frame injector 1214 and local memory 1212. The frame re-director 1210 is a device that can inspect frames and select specific frame types for diversion into local storage accessible to the classifier and flow controller. The frame injector 1214 can emit frames into the data stream from the local memory 1214 that is accessible by the classifier and flow controller. The frame re-director 1210 adds little or no latency to the traversal time of those frames which are not diverted.

The switch embodiment operates in a storage network such as Fibre Channel that support a SCSI-3 protocol and that have the attribute that SCSI commands and their status responses are sent in distinct frames or packets, one per command. The frame re-director 1210 is configured to divert only those frames that contain either a request or its status response. For Fibre Channel this is done by inspecting fields in the frame header.

The configuration phase for an embodiment with switch gateways is the same as previously described in reference to FIG. 3. The specific content of the data involved will differ because of the different system.

Figure 13:
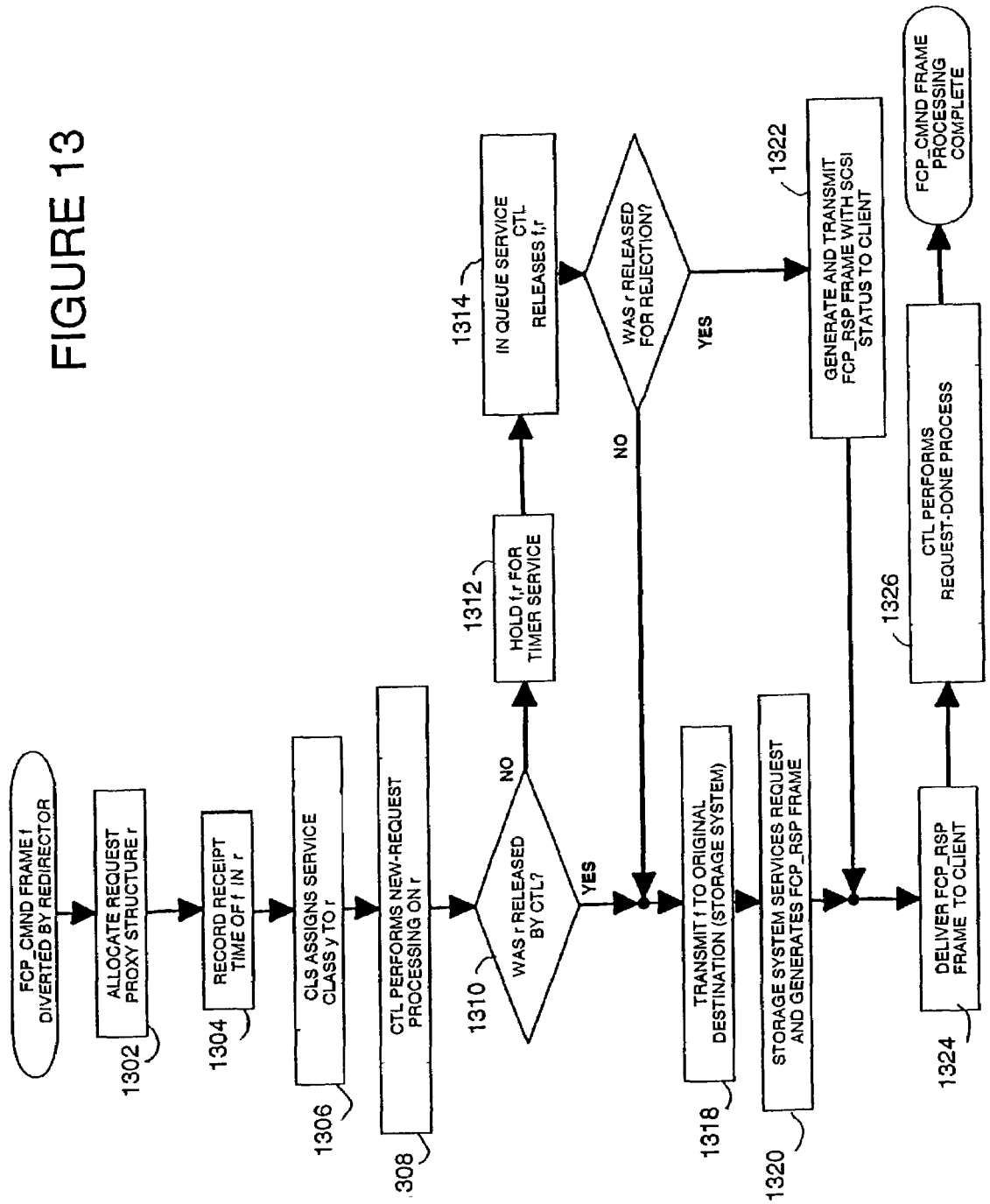
FIG. 13 is a flow chart of a preferred embodiment for processing an I/O request by the switch device of the invention.

The operation of the switch gateway is illustrated in FIG. 13. The process described begins when the frame re-director 1210 in FIG. 12 directs a frame containing a request into the local memory 1212. Then the classifier allocates a data structure that represents that request (step 1302), records the arrival time (step 1304), and performs the process illustrated in FIG. 5 to assign the request into a service class (step 1306). The flow controller then performs the new-request processing illustrated in FIG. 6 (step 1308). If the request structure is on the delay queue after this step, it is held there for timer service (step 1312) until the queue service process illustrated in FIG. 10 causes the request to be released from the delay queue (step 1314). If the request was released for completion (i.e., not release for rejection), the frame injector 1214 transmits to the storage system the frame containing the initial request, whose contents are in local memory 1212 (step 1318). The storage system services the request and generates the frame containing the response (step 1320). This frame is intercepted by the frame re-director 1210 and a copy of it is placed in local memory 1212 with a record of the completion time. The delivery of the status frame to the client is completed (step 1324). The flow controller then reads the status frame and performs the request-done process illustrated in FIG. 8.

If the release of the request in step 1314 was a release for rejection, the frame injector generates an FCP_RSP frame that contains the rejection status (step 1322). This frame is then transmitted to the client (step 1324) and the request-done process is performed (step 1326). If the client and storage system use a protocol to ensure end-to-end integrity of the command sequence, such as a progressing sequence counter, it may also be necessary for the frame injector 1214 to generate a low-cost replacement command (such as a SCSI TEST UNIT READY command) and submit it to the storage system in place of the rejected command, and for the frame re-director 1210 to intercept the returned status for the replacement command and not transmit it to the client.

If after step 1308 the request was not on the delay queue, then the request is submitted immediately for servicing by the storage system, proceeding through steps 1318 through 1326.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. In a storage system having one or more resources, one or more clients, a request classifier and a flow controller, a method for optimizing performance comprising steps of:

receiving service requests from clients;

transmitting the service requests to a gateway for recording timestamps on the service requests:

sending the service requests from the gateway to the request classifier:

associating, by the request classifier, each service request with a service class, said service class corresponding to a set of operational limits for limiting each service request's use of the storage system's resources, wherein the set of operational limits are determined from performance characters of the system resources and from level of performance guaranteed to each client;

determining, by the flow controller, with use of the set of operational limits corresponding to the service class, whether and by how much time the submission of a service request for processing should be delayed; and submitting the service request to the one or more resources for processing based on the determining step of the flow controller.

2. The method of claim 1 wherein the set of operational limits corresponds to desired maximum rates at which the resources process the service requests in said service class so as not to affect the service requests in other service classes that need the same resources.

3. The method of claim 1 wherein the set of operational limits includes a rate of transmitting data between the clients and the resources.

4. The method of claim 1 wherein the set of operational limits includes a rate of performing disk I/O operations.

5. The method of claim 1 wherein the set of operational limits includes a rate of performing cache-miss disk I/O operations.

6. The method of claim 1 wherein the set of operational limits includes a rate of performing non-sequential operations by the resources.

7. The method of claim 1 wherein the storage system includes multiple channels for accessing data at the resources and the set of operational limits includes a rate of data transmission over the channels.

8. The method of claim 1 wherein the set of operational limits includes a rate at which cache pages are displaced.

9. The method of claim 2 wherein a single set of operational limits applies to a total usage rate for all resources belonging to a same workload group.

10. The method of claim 2 wherein separate sets of operational limits respectively apply to separate resources of the same workload group.

11. The method of claim 2 wherein the flow controller delays the submission of a request to ensure that the service requests submitted for a given service class do not exceed the operational limits corresponding to said service class.

12. The method of claim 2 wherein the flow controller rejects some of the service requests to ensure that those submitted for a particular service class do not exceed the operational limits for said particular service class.

13. The method of claim 2 wherein: each service class corresponds to a set of service level objectives, said service level objectives including a desired response time for processing the service requests in said service class during a time interval and a usage constraint associated with each resource, and the desired response time should be achieved whenever the usage constraints is satisfied.

14. The method of claim 13 wherein the desired response time is such that an aggregate response time of all service requests be less than a target response time for said service class.

15. The method of claim 13 wherein the desired response time is such that a percentage of the service requests whose response time exceeds a target response time be less than a tolerance limit for said service class.

16. The method of claim 13 wherein the resource usage constraint is such that actual usage of a resource be less than a limit corresponding to said resource and said service class.

17. The method of claim 13 wherein the resource usage constraint is such that actual usage of a resource be less than a first limit corresponding to said resource and said service class, and that a peak requested usage rate be less than a second limit corresponding to said resource and said service class.

18. The method of claim 14 wherein the service level objectives are evaluated to determine the resource operational limits.

19. The method of claim 18 wherein the evaluation includes considering expected and worst-case utilization of the resources in view of the service level objectives.

20. The method of claim 19 further comprising the step of determining whether the storage system could meet the target aggregate response time based on said evaluation.

21. The method of claim 20 further comprising the steps of: accepting the service level objectives if they can be achieved based on said evaluation; rejecting the service level objectives if they cannot be achieved based on said evaluation; and applying the accepted service level objectives as the resource operational limits.

22. The method of claim 20 wherein the evaluation includes comparing actual performance of the storage system with past operational limits and resource usage.

23. A storage system with improved performance comprising:
one or more resources;
one or more clients having requests for resources;
a gateway for recording request timestamps;
a request classifier for associating each request with a service class, said service class corresponding to a set of operational limits for limiting each request's of the storage system's resources, wherein the set of operational limits are determined from performance characteristics of the system resources and from level of performance guaranteed to each client; and
a flow controller for determining, with use of the set of operational limits corresponding to the service class, whether and by how much time the submission of a request for processing should be delayed submitting the request to the one or more resources for processing based on the determining of the flow controller.

24. A computer-program product stored on a storage system to improve performance, the system having one or more resources, one or more clients having requests for resources, a request classifier and a flow controller, the computer-program product comprising computer program code for:
directing a gateway to record a timestamp for each request;
directing the request classifier to associate each request with a service class, said service class corresponding to a set of operational limits for limiting each request's of the storage system's resources, wherein the set of operational limits are determined from performance characteristics of the system resources and from level of performance guaranteed to each client;
directing the flow controller to determined, with use of the set of operational limits corresponding to the service class, whether and by how much time the submission of a request for processing should be delayed; and
directing the flow controller to submit the request to one or more resources for processing based on the determining of the flow controller.

* * * * *